June 14, 1938.                G. W. LANE                2,120,253
                         POTTERY MAKING MACHINE
                          Filed Oct. 27, 1936            2 Sheets-Sheet 1
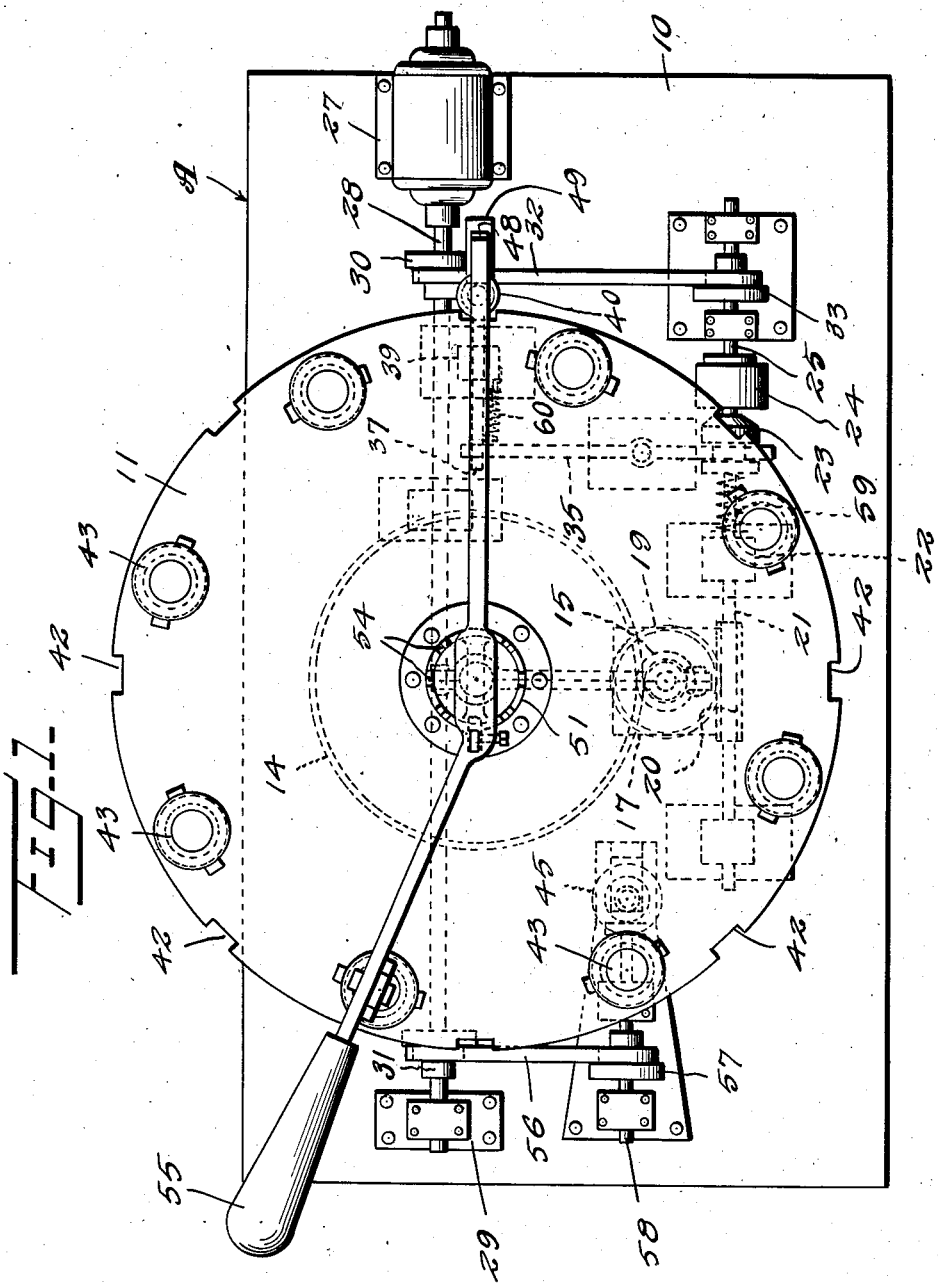
G.W.Lane
INVENTOR
BY Victor J.Evans&Co.
ATTORNEY

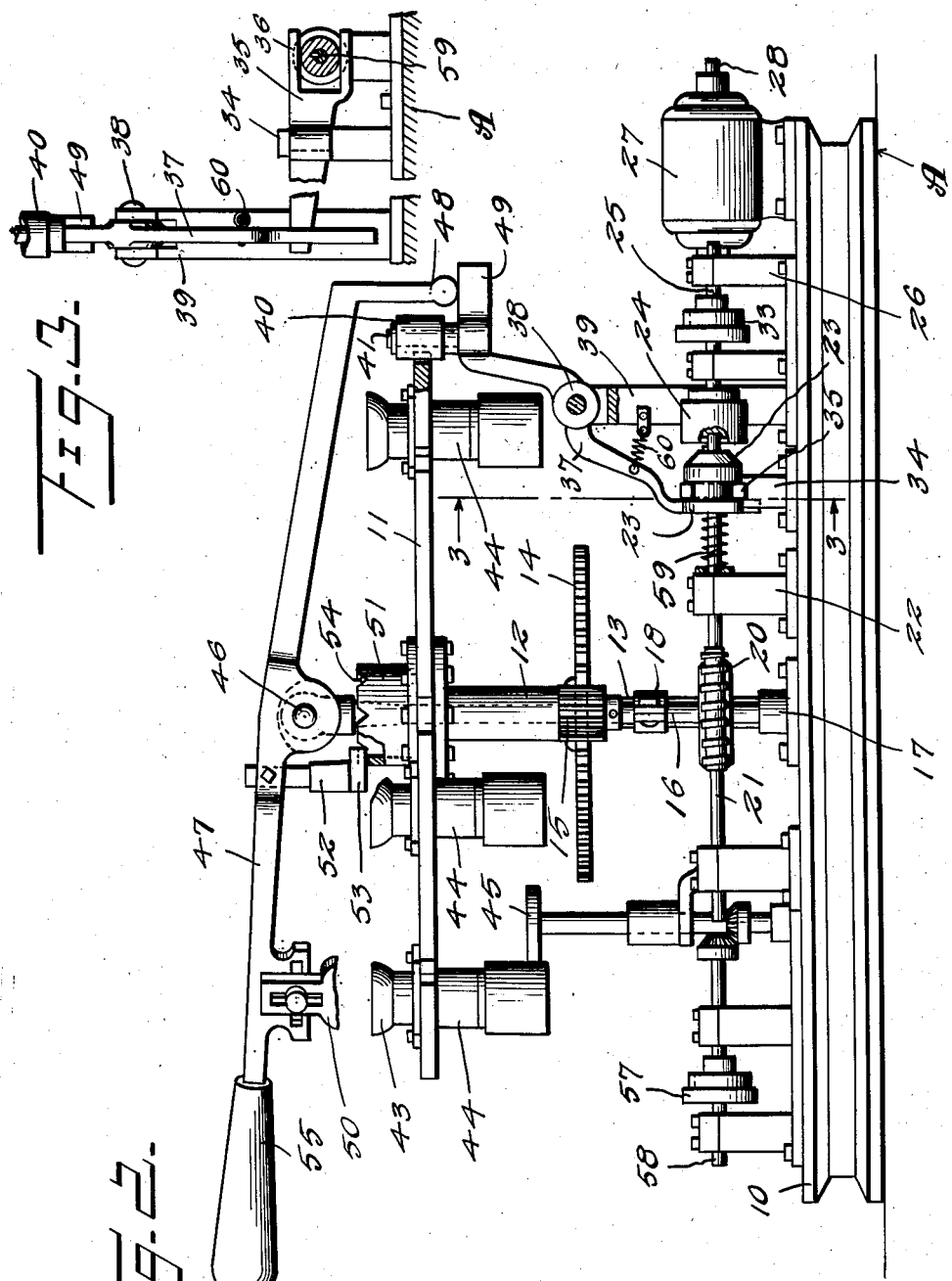

Patented June 14, 1938

2,120,253

UNITED STATES PATENT OFFICE 2,120,253

POTTERY MAKING MACHINE

George Wilmer Lane, Canonsburg, Pa.

Application October 27, 1936, Serial No. 107,885

1 Claim. (Cl. 25—24)

The invention relates to a pottery making machine and more especially to a semi-automatic pottery forming apparatus.

The primary object of the invention is the provision of a machine or apparatus of this character, wherein the molds for the pottery clay are carried upon a turntable and the same are brought into position automatically and locked in such position for confronting a distributing tool for the formation of pottery ware and such apparatus or machine being of novel construction in its entirety so as to enable increased production with dispatch of pottery.

Another object of the invention is the provision of an apparatus or machine of this character, wherein the tool for the formation of pottery ware is manually operated and under manual operation controls the working of the machine or apparatus for the bringing of the pottery molds successively in position and the locking or holding of each mold when confronting the tool for the making of the pottery ware.

A further object of the invention is the provision of an apparatus or machine of this character, which is simple in its construction, thoroughly reliable and efficient in operation, enabling the easy handling thereof in the production of pottery ware, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is top plan view of the machine constructed in accordance with the invention.

Figure 2 is a side elevation of the same partly in section.

Figure 3 is a fragmentary sectional view on the line 3—3 of Figure 2 looking in the direction of the arrows.

Similar reference characters indicate corresponding parts throughout the several views in the drawings.

Referring to the drawings in detail, A designates generally the machine or apparatus comprising a suitable base or bed 10 above which is arranged a turntable 11 fixed to a perpendicular hub 12 rotatably journaled upon a stationary post or axle 13 suitably fixed at its lower end in a casting therefor as carried by the base or bed 10. The hub 12 is provided with a gear 14 meshing with a pinion 15 fixed to a stud shaft 16 journaled in a lower bearing 17 on the bed or base 10 and an upper bearing 18 clamped to the post 13 so that this stud shaft 16 is parallel with and spaced from the said post. The stud shaft 16 has thereon a worm gear 19 meshing with a worm screw 20 formed on a drive shaft 21 journaled in bearings 22 on and rising from the base or bed 10. The shaft 21 has splined or keyed thereto a shiftable male member 23 of a friction clutch, the female member 24 of which is made fast to a shaft 25 companion to the shaft 21. This shaft 25 is journaled in bearings 26 on and rising from the bed or base 10.

Upon the bed or base 10 at a suitable location is an electric power motor 27, its driving shaft 28 is journaled in suitable bearings 29, this shaft being of considerable length to extend for a major portion of the length of the bed or base 10 and carries the stepped driving pulleys 30 and 31, respectively. The pulley 30 is fitted with an endless drive belt 32 which is trained over a driven pulley 33 on the shaft 25 thus power from the motor 27 operates or drives the shaft 25 and in turn when the shaft 21 is clutched therewith it will be driven thereby.

Carried by the base or bed 10 is a vertical pivot stud 34 for a horizontal swinging forked throw arm 35, its fork 36 being loosely engaged with the male member 23 of the clutch. This arm is engaged with a vertically swinging rocking lever 37, its pivot 38 being in an upright 39 on and rising from the base or bed 10. The heel end of the lever 37 is fitted with a stock roller 40 upon a vertical axle stud 41 and adapted to engage in any one of a series of notches 42 provided in the periphery of the turntable 11. These notches 42 are uniformly spaced from each other and when the roller engages in any one of the same the said table 11 is latched against movement.

Fitted on the turntable 11 close to the outer periphery thereof is a series of spaced article molds 43, each having associated therewith jigging mechanism including a head 44 and such mechanism is operated in a conventional manner, as, for example, through friction gearing 45 operated from the shaft 28.

The post 13 is extended above the turntable 11 and has fulcrumed at its upper end 46 a tool carrying lever 47 which is formed with a depending toe 48 engageable with the heel 49 of the lever 37. This lever 47 carries an adjustable tool 50 for the shaping of the content of each mold 43 when such tool 50 is lowered into working position.

The turntable 11 has fitted therewith a centering ring 51 while carried by the lever 47 is a combined centering and locking key or bolt 52 having a substantially V-shaped or wedging edge 53 for seating in V-shaped notches 54 provided in the upper edge of the ring 51 and this key or bolt when engaging a companion notch 54 functions to center the roller 41 in the notch 42 receiving the same so as to assure the centering of the tool 50 with respect to the work in a confronting mold 43 therewith.

When the lever 47 at its handle end 55 is raised the toe 48 presses upon the heel 49 of the lever 47 which connects the member 23 with the member 24 of the clutch and thus the said clutch will join the shafts 21 and 25 with each other so that motion from the motor 27 will be submitted through the gear 14 and pinion 15 to the turntable 11 for its rotation and in this fashion in successive order advancing the molds 43 to working position with relation to the tool 50. When the lever 47 is depressed the turntable 11 is latched against movement and the member 23 is disengaged from the member 24 of the clutch so that driving power from the motor 27 is cut off from the turntable 11. The shaft 28 has trained over the pulley 31 thereon a belt 56 which is also trained over a pulley 57 on a shafting 58 of the gearing 45 so that in this manner power from the motor 27 is conveyed to the friction gearing 45 for the operation of the jigging mechanism 44.

In this instance the turntable 11 is provided with a group of eight molds and it is, of course, understood that the group may be decreased or increased as to the number of molds included therein.

The apparatus or machine is semi-automatic as the tool 50 is manually controlled in the production of pottery ware.

The male member 23 is urged into clutching relation to the member 24 of the said group by a coiled expansion spring 59 while engaged with the lever 37 is a coiled retractile spring 60 operating to lift the heel end of the said lever to throw the roller 40 into a notch when confronting the same in the turntable 11 on the lowering of the lever 47.

What is claimed is:

A machine of the character described comprising a turntable having edge notches, molds carried by the turntable close to its periphery, jigger mechanism cooperating with the molds, a tool-carrying lever pivotally supported for vertical movement above said turntable, power mechanism for driving the turntable and having a releasing clutch, means for engaging the notches in the turntable and operatively connected with the clutch and actuated by said tool-carrying lever for effecting the disengagement of said means from a notch in the turntable and the simultaneous closing of said clutch, and means on the tool-carrying lever and engageable with the turntable for the centering of a tool with respect to the mold on the opening of the clutch and the engagement of the first-named means in the notch in said table.

GEORGE WILMER LANE.